A. H. MEYER.
REEL.
APPLICATION FILED MAR. 4, 1911.
1,058,995. Patented Apr. 15, 1913.
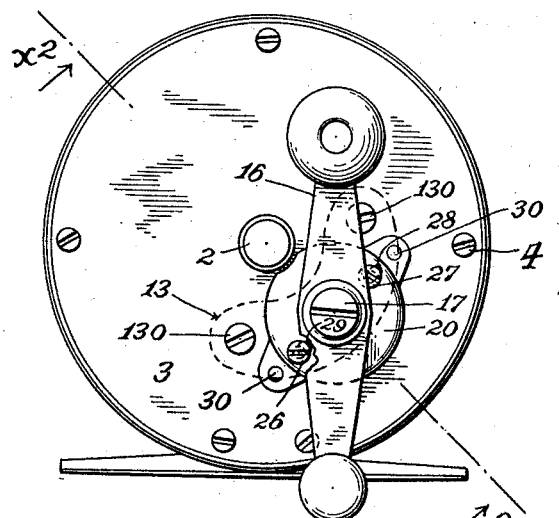
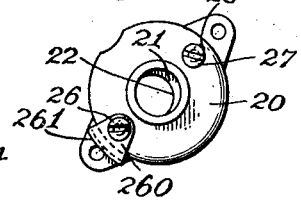
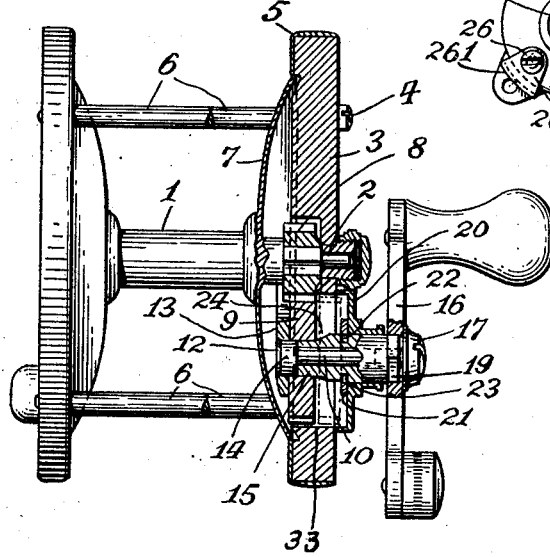
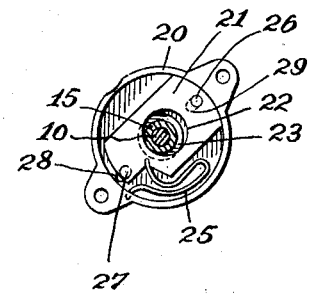
Attest:
August H. Meyer Inventor:
by Alexander C. Proudfit,
Atty.

UNITED STATES PATENT OFFICE.

AUGUST H. MEYER, OF NEWARK, NEW JERSEY, ASSIGNOR TO ABBEY & IMBRIE, OF NEW YORK, N. Y., A CORPORATION OF NEW YORK.

REEL.

1,058,995.  Specification of Letters Patent.  Patented Apr. 15, 1913.

Application filed March 4, 1911. Serial No. 612,430.

*To all whom it may concern:*

Be it known that I, AUGUST H. MEYER, of Newark, New Jersey, have invented certain new, original, and useful Improvements in Reels, of which the following is a full, clear, and accurate description, like numerals in the drawings and description designating like parts.

This invention relates to reels and is of particular utility when embodied in fishing-reels, although I contemplate the utilization of my improvements in any field to which they are adapted by their nature.

An important object of my invention is to provide a compact attachment for fishing reels, comprising mechanism to throw the winding-handle into and out of gear with the winding-spool, my improved device for this purpose being sure and rapid in operation, easily applied, and of such simple and inexpensive construction as to permit its use upon reels of a class which heretofore have lacked this very important adjunct to the skill and enjoyment of the angler. Accordingly, in the preferred embodiment of my invention, I provide a gear having an elongated hub, arbor or actuating shaft provided with an actuating handle by which it may be rotated for winding, and also moved co-axially into its operative and inoperative positions, and a housing to surround the shaft and gear, with a sliding catch-plate to enter grooves in the operating shaft, a spring serving to press the catch-plate into these grooves, of which one has a straight retaining wall to hold the shaft and gear in its operative position until released manually, which may be accomplished by means of a stud projecting from the catch-plate through the wall of the housing, while the other groove has a beveled wall so that mere inward pressure on the handle is sufficient to throw out the catch-plate and throw the gear into operative position. The above parts constitute an attachment which may be applied to existing reels after forming an opening in the end-plate of the reel through which opening the gear may be introduced into mesh with the usual pinion on the spindle of the winding-spool of the reel.

The various features of my invention will be illustrated and described fully in the accompanying drawings and specification, and pointed out in the claims.

In the drawings, Figure 1 is a view in front elevation of a fishing reel in the construction of which my improvements have been embodied; Fig. 2 is a vertical, sectional view taken on the broken line $x^2$—$x^2$, Fig. 1; parts being shown in elevation; and Fig. 3 is a rear view of the attachment taken separately from the reel, the housing being shown in elevation and the winding shaft and its post in section. Fig. 4 is a detail view in perspective of the finger-piece for operating the catch-plate; and Fig. 5 is a plan-view of the housing and catch-plate taken separately, the reel and handle being omitted.

In the embodiment of my invention selected for illustration and description to enable ready and complete understanding of my improvements, the part designated by the reference numeral 1 is the spool of a reel of any suitable construction, shown herein as comprising a spindle journaled at 2 in a bearing-plate 3 secured by screws 4 to the head-ring 5 of a frame having rungs 6, all of which may, and preferably will, be of usual construction, well-known to those skilled in the art, as will also the spool-end 7 and the pinion 8.

For the actuation of the spool, various suitable forms of mechanism may be adopted, according to the exigencies of the work which the reel is to perform, and I have shown by way of example a gear-wheel 9 mounted to rotate upon a post 10 having one end 12 upset within a supporting bridge 13 secured as by screws 130, (see Fig. 1) to the plate 3, the post having a steadying collar 14 and preferably being smooth throughout to permit free movement of the gear 9 along the axis of the post and its removal endwise from the post at times.

The gear 9 is shown as having a hollow shaft or arbor 15, which, for the sake of convenience, may be forced tightly into the gear, and for the sake of strength, and simplicity of construction, shaft 15 may be adapted to receive the winding-handle or crank 16, the latter being secured in place by suitable means, such as the screw-nut 17.

In the instance illustrated, the end 19 of the shaft 15 is arranged to transfix the shank of the handle, and has a squared joint therewith, this serving as one convenient form of means to connect the shaft with the winding-handle to permit actuation of the gear 9 thereby, and also to permit the handle to be utilized to cause movements of the gear 9 along its axis, in order to disengage the gear 9 from the pinion 8, with which it is shown in operative engagement in Fig. 2, in its full-line position, so that after using the handle 16 to wind the spool 1 it is only necessary to pull outward on the handle 16 to release spool and allow the fishing line to run off freely, the dotted lines indicating the inoperative position of the gear.

Normally, it is desirable to hold the gear 9 in engagement with the pinion 8, and for this purpose I may provide any suitable means falling within this feature of my invention, which comprises a compact housing 20, surrounding the shaft 15 and having a catch 21 mounted upon the housing in place to slide transversely with respect to the shaft 15 and to be engaged with the shaft at times to limit movement of the gear 9 along its axis. The construction of this sliding catch may be of any suitable form, and I have shown it (see Fig. 3) by way of example as having a substantially circular opening 22 of sufficiently large dimensions to pass the shaft 15, the slide being of suitable thickness to enter freely into each of a plurality of grooves, 23, 24 formed in the periphery of the shaft 15, suitable means, such as the spring 25 (see Fig. 3) being provided, preferably, tending normally to force the wall of the opening 22 toward the axis of the shaft 15, and into either of the grooves 23, 24 which may lie in the path of the slide at a given time.

In operation, when the slide 21 lies in the groove 23, the shaft 15 will be at its inward position, with the gear 9 in mesh with the pinion 8, and as it is desirable ordinarily to maintain the gear 9 and pinion 8 in such actuative relation, so that the handle 16 may operate the spool 1, I prefer to form the groove 23 with straight walls, but I prefer to form the groove 24 with an inclined forward wall, so that when the gear 9 occupies the position indicated by dotted lines in Fig. 2, the slide 21 lying in the groove 24, and the spool 1 being free to run, it is only necessary to press inward upon the handle 16, when the inclined wall of the groove 24 will force the sliding catch-plate 21 laterally outward, and the shaft may be moved freely inward to mesh the gear 9 with the pinion 8 and the handle 16 can once more actuate the spool 1, the catch 21 entering once more into the groove 23 (see Fig. 3).

In order to release the shaft 15 by sliding the catch 21 out of the groove 23, any suitable means may be provided, and as one convenient form of such means I have shown screw-studs 26, 27 attached to the catch 21, and passing through slots 28, 29 in the head of the housing 20, the heads of these screws being preferably presented in a position con- venient to the thumb or finger of the operator as he grasps the handle 16, and by moving one of these screw-studs leftward from the position illustrated in Fig. 1, the operator moves the sliding catch 21 out of the groove 23, and the handle 16 may be pulled out to release the spool 1. If desired, I may provide a finger-piece 260 having a wing 261 to present a broader and more convenient portion for actuation by the operator.

The housing 20 may be secured in place by any convenient means, as for example, by screws 30, (see Fig. 1) upon the plate 3, and it will be observed that by simply cutting a hole 33 in the end-plate 3 of an ordinary fishing-reel, making this hole of sufficient size to pass the gear 9, my improved attachment, comprising the gear 9 with its shaft 15 and handle 16, and the housing 20 with its slide 21, may be applied, without further alteration of the reel, and without increasing its length.

Having described and illustrated my invention thus fully, and suitable means by which it may conveniently be put into practice, I wish it understood that I do not limit myself to the specific construction and materials selected for illustration and description by way of example, nor in general do I limit myself otherwise than as set forth in the claims, read in connection with this specification.

What I claim as new, and desire to secure by Letters Patent, is:—

1. A positioning device for sliding gears in reels of the class described; said device comprising a closure having an opening to pass the operating shaft for said gear and permit co-axial movement thereof; a catch-plate carried by and movable slidingly along the inner surface of, said closure across the path of said shaft for engagement therewith, said catch-plate having a central opening to pass said shaft and a wall to enter grooves in the periphery of said shaft, a screw-stud upon said catch-plate to permit manual operation thereof, said closure having a slot to pass said stud, the head of said stud serving to retain said catch-plate in operative position.

2. A sliding catch-plate for sliding gears in fishing-reels of the class described, said catch-plate having a stud projecting into position to be actuated by an operator, and in combination therewith a closure to which said sliding catch-plate is secured slidingly with said stud projecting therethrough, an axially movable gear with a grooved shaft to be engaged by said catch-plate, and a spring tending to hold said catch-plate normally toward one end of its path of movement in engagement with said grooved shaft.

3. The combination, with a fishing-reel, of a gear having an actuating-shaft and actuating-handle by which said gear may be rotated and moved co-axially, said shaft having a groove with a straight retaining-wall and a groove with a beveled retaining-wall, and a catch-plate mounted to slide transversely of said shaft into straight-walled-groove to hold said shaft and gear in operative position, and into said beveled-wall-groove to hold said shaft and gear yieldingly in an inoperative position, a spring to press said catch-plate toward said shaft, and means to withdraw said catch-plate manually from said shaft when said catch-plate is within said straight-walled-groove, movement of said shaft co-axially toward operative position being sufficient to throw said catch-plate against the action of said spring by engagement of said beveled-groove-wall with said catch-plate; and a housing member carrying said catch-plate, actuating shaft and gear, said catch-plate serving to hold said members in assembled relation removable together from said fishing-reel.

Signed at New York, in the county and State of New York, this 11th day of February, 1911.

AUGUST H. MEYER.

Witnesses:
A. W. LANE,
HELLMUTH MOERCHEN.

Copies of this patent may be obtained for five cents each, by addressing the "Commissioner of Patents, Washington, D. C."